D. MACKAY.
APPARATUS FOR INDICATING THE WEIGHT OF A VESSEL'S CARGO.
APPLICATION FILED OCT. 10, 1910.
1,002,857.
Patented Sept. 12, 1911.
FIG. 1.
FIG. 2.
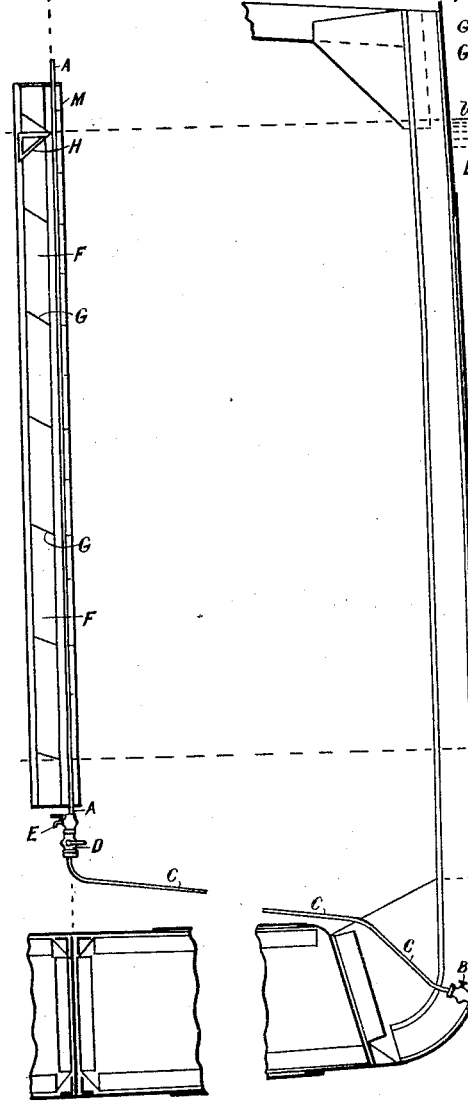
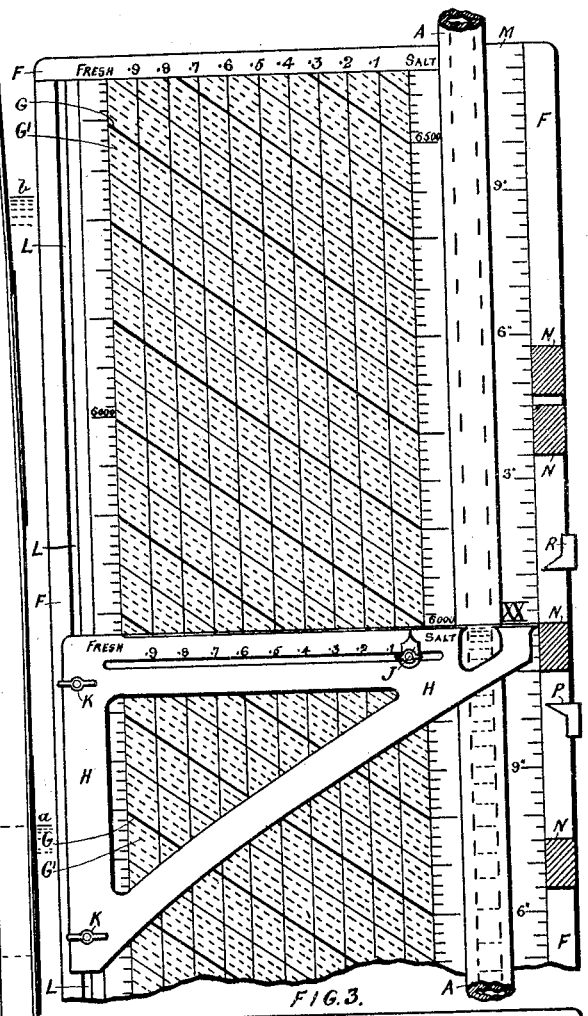
FIG. 3.
WITNESSES
W. P. Burke
John C. Sanders
INVENTOR
Donald Mackay

UNITED STATES PATENT OFFICE.

DONALD MACKAY, OF ALLOA, SCOTLAND.

APPARATUS FOR INDICATING THE WEIGHT OF A VESSEL'S CARGO.

1,002,857.   Specification of Letters Patent.   Patented Sept. 12, 1911.

Application filed October 10, 1910. Serial No. 586,346.

*To all whom it may concern:*

Be it known that I, DONALD MACKAY, a subject of the King of Great Britain and Ireland, residing at Alloa, in the county of Clackmannan, Scotland, have invented new and useful Improvements in Apparatus for Indicating the Weight of a Vessel's Cargo, of which the following is a specification.

My said invention relates to apparatus of the type comprising a water-gage tube connected to the external water and a graduated scale having marked on it the draft and the corresponding deadweight for fresh and salt water respectively, and consists in providing a deadweight scale graduated for the range of densities from fresh to salt water, and a cursor adapted to be employed in combination with such scale whereby the weight of cargo or the like placed on board ship, is obtained in a simple and expeditious manner.

In carrying out my invention the water-gage tube is placed inside the ship at the middle, or center line, about amidships, and alongside the gage are placed scales of draft and deadweight. The water-gage extends in a vertical direction from below the "light" water-line, of the ship, to above the "load" water-line. The water-gage communicates at its lower end with the sea water by a pipe led through the ship's side, or bottom, and suitably controlled, and the top of the water-gage is open to the atmosphere. The sea water on being admitted flows in until it rises in the water-gage to the level of the water outside the ship, and thus indicates the mean draft of the ship. In close proximity to the water-gage are placed the scales of draft and deadweight, hereinbefore referred to. By means of curves drawn between the extremes of fresh and salt water the deadweight at any density can be read off, in relation to the height of the water level in the tube.

In order that my said invention and the manner of performing the same may be properly understood I hereunto append a sheet of explanatory drawings to be hereinafter referred to in describing my inventon.

Figure 1, is a transverse section of a part of a ship showing my improved apparatus fitted thereto. Fig. 2, is a view of the upper part of the indicator, drawn to an enlarged scale, and Fig. 3, is a plan.

In these drawings the same reference letters are used to mark the same or like parts wherever they are repeated.

As shown in Fig. 1, of the drawings, the apparatus consists of a vertical glass tube A, placed near amidships at the center line of the ship and extending from below the "light" water-line $a$, to above the "load" water-line $b$. The lower end of the tube A, communicates with the water outside the ship through the valve B, and pipe C. A shut-off cock D, is provided to regulate the supply of water to the tube A, and a tap E, is also provided for drawing off water to be tested by a hydrometer. Beside the tube A, there is placed a board F, on which are drawn deadweight scales for salt and fresh water with curves G, drawn between them for intermediate densities of water. A cursor H, is provided in connection with the board F, and can be moved up and down to facilitate reading of the scales.

Fig. 2, of the drawings shows the top end of the indicator as it would appear when made for a vessel carrying 6,000 tons on a 20 foot draft. The column marked "Salt" is the scale of tons deadweight for salt water, and the column marked "Fresh" is the scale of tons deadweight for fresh water. The lines G, and the dotted lines $G^1$, drawn between these two scales are curves of tons deadweight for all densities between salt water and fresh water. The vertical lines indicated by the figures .1, .2, .3, .4, .5, .6, .7, .8, and .9, are to enable particular scales to be read off. In this case they are shown at distances of .1, of the difference in density between salt and fresh water. The cursor H, is also marked with the words "Salt" and "Fresh," and the figures .1, .2, .3, .4, .5, .6, .7, .8, and .9, to correspond with the words and figures at the top of the board F.

The apparatus is used as follows: The water having been admitted to the tube A, rises in that tube to the level of the water outside the ship, and the density of the water having been tested by a hydrometer, the pointer J, is then moved across the cursor H, to the point corresponding to the density which has been found. The cursor H, is now moved up, or down, until its top edge is at the water level, and then opposite the pointer J, can be read the number of tons deadweight on board the ship. The cursor H, is adjustably connected to the board F, by bolts K, whose heads slide up and down in a groove L, and the bolts may be tightened to hold the cursor in any desired position.

M, is a scale of draft in feet and inches, while N, N, N, N, are marks corresponding to the usual freeboard marks on the outside of the ship.

The pointers P, R, may be moved up and down so as to indicate the heights at which loading begins and ends.

What I claim is:

1. In apparatus for indicating the weight of cargo in a ship, in combination, a water gage consisting of a tube open to the atmosphere and communicating with the water line below the "light" water line of the ship, a scale of deadweight positioned in juxtaposition to said tube, said scale being provided with curves corresponding to the range of densities from fresh water to salt water and an indicator operatively associated with said scale and said tube and adapted to indicate the deadweight corresponding to the density of the water and the height of the water in the tube.

2. In apparatus for indicating the weight of cargo in a ship, in combination, a water gage consisting of a tube open to the atmosphere and communicating with the water line below the "light" water line of the ship, a scale of deadweight positioned in juxtaposition to said tube, said scale being provided with curves corresponding to the range of densities from fresh water to salt water, an indicator operatively associated with said scale and said tube, and adapted to be moved relatively thereto into register with the upper level of the water in the tube and movable means carried by said indicator to be moved into register with any one of the curves on the scale corresponding to the density of the water whereby the deadweight may be determined.

In testimony whereof I have signed my name to this specification in the presence of two subscribing witnesses.

DONALD MACKAY.

Witnesses:
GEORGE PATTERSON,
DAVID SCRIMGEOUR.

---

Copies of this patent may be obtained for five cents each, by addressing the "Commissioner of Patents, Washington, D. C."